(12) United States Patent
Lee et al.

(10) Patent No.: US 8,599,817 B2
(45) Date of Patent: Dec. 3, 2013

(54) APPARATUS AND METHOD FOR TRANSMITTING/RECEIVING DATA IN WIRELESS COMMUNICATION SYSTEM

(75) Inventors: Il-Gu Lee, Seoul (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 12/969,357

(22) Filed: Dec. 15, 2010

(65) Prior Publication Data

US 2011/0149724 A1 Jun. 23, 2011

(30) Foreign Application Priority Data

Dec. 17, 2009 (KR) .................. 10-2009-0126034

(51) Int. Cl.
*H04L 12/28* (2006.01)
*H04J 1/16* (2006.01)

(52) U.S. Cl.
USPC ........... 370/343; 370/252; 370/329; 370/430; 370/480

(58) Field of Classification Search
USPC ......... 370/216, 236, 249, 232, 253, 330, 332, 370/343, 478, 913, 252, 329, 430, 480; 714/2, 3, 4, 748, 749, 701–705; 455/216, 151.2
See application file for complete search history.

(56) References Cited

U.S. PATENT DOCUMENTS

| | | | | |
|---|---|---|---|---|
| 4,543,654 A * | 9/1985 | Jones | ........................... | 370/445 |
| 5,355,092 A * | 10/1994 | Kosaka et al. | ................ | 329/304 |
| 5,732,113 A * | 3/1998 | Schmidl et al. | ............... | 375/355 |
| 6,470,030 B1 * | 10/2002 | Park et al. | ...................... | 370/480 |
| 6,658,063 B1 * | 12/2003 | Mizoguchi et al. | ........... | 375/260 |
| 6,731,710 B1 * | 5/2004 | Genossar et al. | ............. | 375/362 |
| 7,039,131 B2 | 5/2006 | Banerjea | | |
| 7,170,961 B2 * | 1/2007 | Vandenameele-Lepla | ... | 375/371 |
| 7,269,394 B2 * | 9/2007 | Fei et al. | ......................... | 455/91 |
| 7,272,109 B2 * | 9/2007 | Webster et al. | ............... | 370/208 |
| 7,286,617 B2 * | 10/2007 | Vanderperren et al. | ....... | 375/343 |
| 7,362,802 B2 * | 4/2008 | Saed | .............................. | 375/229 |
| 7,426,199 B2 * | 9/2008 | Sondur et al. | ................. | 370/332 |
| 7,564,927 B2 * | 7/2009 | Wu et al. | ....................... | 375/326 |
| 7,649,963 B2 * | 1/2010 | Choi et al. | ..................... | 375/340 |
| 7,706,437 B2 * | 4/2010 | Saed | .............................. | 375/229 |
| 7,769,074 B2 * | 8/2010 | Nakache et al. | .............. | 375/132 |
| 8,014,366 B2 * | 9/2011 | Wax et al. | ..................... | 370/338 |
| 8,031,691 B2 * | 10/2011 | Ngo et al. | ..................... | 370/349 |

(Continued)

FOREIGN PATENT DOCUMENTS

KR 100770924 B1 10/2007

OTHER PUBLICATIONS

Jian Li et al., "Carrier Frequency Offset Estimation for OFDM-Based WLANs", IEEE Signal Processing Letters, vol. 8, No. 3, pp. 80-82, Mar. 3, 2001.

*Primary Examiner* — John Pezzlo
(74) *Attorney, Agent, or Firm* — Rabin & Berdo, P.C.

(57) ABSTRACT

Provided is an apparatus and method for transmitting and receiving data. The method includes respectively estimating a carrier frequency offset (CFO) of data packets transmitted during a transmit opportunity (TXOP) period by a unit of a packet; calculating an average CFO of the estimated CFOs estimated during a window period for the data packets; and compensating an estimated CFO of a predetermined data packet to one of the estimated CFO of the predetermined data packet and the average CFO, and restoring the predetermined data packet.

15 Claims, 5 Drawing Sheets

(56) References Cited

U.S. PATENT DOCUMENTS

| | | | | |
|---|---|---|---|---|
| 8,074,152 B2* | 12/2011 | Oh et al. | | 714/784 |
| 8,111,654 B2* | 2/2012 | Ngo et al. | | 370/329 |
| 8,184,523 B2* | 5/2012 | Belotserkovsky et al. | ... | 370/208 |
| 8,300,661 B2* | 10/2012 | Singh et al. | | 370/473 |
| 2003/0072397 A1* | 4/2003 | Kim et al. | | 375/347 |
| 2006/0176802 A1* | 8/2006 | Ko et al. | | 370/208 |
| 2007/0211785 A1 | 9/2007 | Nakache et al. | | |
| 2008/0273600 A1* | 11/2008 | Singh et al. | | 375/240.26 |
| 2011/0019749 A1* | 1/2011 | Wilhelmsson et al. | | 375/259 |

* cited by examiner

APPARATUS AND METHOD FOR TRANSMITTING/RECEIVING DATA IN WIRELESS COMMUNICATION SYSTEM

CROSS-REFERENCES TO RELATED APPLICATIONS

The present application claims priority of Korean Patent Application No. 10-2009-0126034, filed on Dec. 17, 2009, which is incorporated herein by reference in its entirety.

BACKGROUND OF THE INVENTION

1. Field of the Invention

Exemplary embodiments of the present invention relate to a wireless communication system; and, more particularly, to an apparatus and method for normally transmitting and receiving data by compensating a Carrier Frequency Offset (CFO) for a wireless channel in a wireless communication system.

2. Description of Related Art

Many studies have been actively made for providing services with QoS (Quality of Service) to users in a next generation communication system. Particularly, many studies for a wireless local area network (WLAN) have been made through Institute of Electrical and Electronics Engineers (IEEE) 802.11 specification. Regarding a WLAN system, many studies for transmitting data through a wireless channel have been in progress. Lately, methods for transmitting and receiving data effectively using a limited wireless channel in an IEEE 802.11 system have been introduced.

Recently, an Orthogonal Frequency Division Multiplexing (OFDM) communication system has been applied to a wireless communication system. Such an OFDM communication system transmits and receives a mass amount of data through a wide bandwidth. In the OFDM communication system, each subcarrier of a wireless channel has an orthogonal property in order to transmit and receive a mass amount of data. In order to improve a data transmit rate of a limited wireless channel, the OFDM communication system determines a channel state of a wireless channel and control transmitting and receiving data based on the determined channel state of the wireless channel.

As an example of controlling transmitting/receiving data based on a wireless channel state, an OFDM communication system estimates a Carrier Frequency Offset (CFO) by a unit of a packet and restores a transmitted data packet by compensating the estimated CFO. However, it is difficult to accurately estimate a CFO when a wireless channel state is very poor, for example when a signal to noise ratio (SNR) of a wireless channel is smaller than a predetermined threshold value or when fading is seriously generated in a wireless channel environment. When the transmitted data packet is restored by compensating an inaccurately compensated CFO, a data packet restoration error rate increases. When signal field information is incorrectly restored, a restoration error would be continuously generated.

As described above, when a CFO is estimated from a data packet transmitted through a wireless channel having a poor state, for example, a wireless channel having serious fading, it is difficult to accurately estimate CFO. When the transmitted data packet is restored based on an inaccurate CFO, a data packet error is generated. It causes a data packet error rate increased. As a result, a data transmit rate becomes decreased. Particularly, if a terminal in an OFDM communication system is a mobile terminal, fading is further seriously generated and a poor wireless channel state abruptly varies. Accordingly, the inaccurate estimation of CFO and the data packet error are further frequently generated. As a result, a data transmit rate becomes significantly deteriorated and an overall system performance also becomes rapidly dropped.

Therefore, there have been demands for developing a data transmitting/receiving method for minimizing errors to be generated while restoring a data packet and improving a data transmit rate by accurately estimating a CFO of a data packet transmitted through a wireless channel in a wireless communication system such as an OFDM communication system.

SUMMARY OF THE INVENTION

An embodiment of the present invention is directed to an apparatus and method for transmitting/receiving data in a wireless communication system.

Another embodiment of the present invention is directed to a data transmitting/receiving apparatus and method for improving a data transmit rate by accurately estimating a CFO of a data packet transmitted through a wireless channel in a wireless communication system.

Another embodiment of the present invention is directed to a data transmitting/receiving apparatus and method for minimizing a transmission error of a data packet by accurately estimating and compensating a CFO according to a wireless channel environment in a wireless communication system.

Another embodiment of the present invention is directed to an apparatus and method for transmitting and receiving data at a high speed by minimizing a CFO estimation error and reducing a data packet transmission error in a multipath fading state or a poor wireless channel state.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an method for transmitting and receiving data includes respectively estimating a carrier frequency offset (CFO) of data packets transmitted during a transmit opportunity (TXOP) period by a unit of a packet; calculating an average CFO of the estimated CFOs estimated during a window period for the data packets; and compensating an estimated CFO of a predetermined data packet to one of the estimated CFO of the predetermined data packet and the average CFO, and restoring the predetermined data packet.

In accordance with an embodiment of the present invention, an apparatus for transmitting and receiving data in a wireless communication system, includes a transmitter configured to transmit data packets during an transmit opportunity (TXOP) period through a wireless channel, an estimator configured to estimate a carrier frequency offset (CFO) of each data packet transmitted during the TXOP period and calculate an average CFO of the estimated CFOs of a predetermined window period which is defined as a packet unit formed of a predetermined number of packets, and a receiver configured to restore a predetermined data packet by compensating an estimated CFO of the predetermined data packet to one of the estimated CFO of the predetermined data packet and the average CFO.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention relates to an apparatus and method for transmitting/receiving data in a wireless communication system such as a Wireless Local Area Network (WLAN) and an Institute of Electrical and Electronics Engineers (IEEE) 802.11 system. Although the apparatus and method for transmitting/receiving data in accordance with an embodiment of the present invention will be described based on the WLAN system and the IEEE 802.11 system throughout the specification, the present invention is not limited thereto. The apparatus and method for transmitting/receiving data in accordance with an embodiment of the present invention may be applied to other communication systems.

The present invention relates to an apparatus and method for normally transmitting and receiving data according to a channel environment of a wireless channel in a wireless communication system. The present invention relates to an apparatus and method for normally transmitting and receiving data by compensating a Carrier Frequency Offset (CFO) for a wireless channel where data is transmitted through in a wireless communication system such as an Orthogonal Frequency Division Multiplexing (OFDM) communication system.

The data transmitting/receiving apparatus and method in accordance with an embodiment of the present invention restores a transmitted data packet by estimating a CFO of a data packet transmitted through a wireless channel by a unit of a packet, compensating the estimated CFO based on a wireless channel state, or compensating the estimated CFO at a window period defined as a group of the predetermined number of data packets. Accordingly, the data transmitting/receiving apparatus and method in accordance with an embodiment of the present invention normally transmits and receives data through a wireless channel. Here, the apparatus and method for transmitting/receiving data in accordance with an embodiment of the present invention estimates a CFO for data transmitted through a wireless channel by a unit of a packet. In other words, the apparatus and method for transmitting/receiving data in accordance with an embodiment of the present invention estimates a CFO of a data packet whenever a data packet is transmitted through a wireless channel.

The apparatus and method for transmitting/receiving data in accordance with an embodiment of the present invention compensates an estimated CFO of a corresponding data packet, which is estimated by a unit of a data packet, according to a wireless channel environment of a wireless channel where a data packet is transmitted through or compensates CFOs of data packets transmitted prior to the corresponding data packet, which are estimated in the window period, and restores a data packet transmitted through a wireless channel based on the compensated CFO. Here, the data transmitting and receiving apparatus in accordance with an embodiment of the present invention restores a data packet by compensating the CFO estimated in the window period when a wireless channel state is very poor because of serious fading, noise and interference or by compensating the estimated CFO of the corresponding data packet when the wireless channel environment is good.

A Transmit Opportunity (TXOP) is provided between a base station for transmitting a data packet such as an access point (AP) and a terminal for receiving a data packet to provide a service to a user such as a station (STA) for a predetermined time in the embodiment of the present invention. For example, a transmission available period is provided between an AP and a STA for transmitting and receiving data in an IEEE 802.11 system. During the transmission available period, the AP distorts and transmits a data packet as much as a CFO estimated at the STA when the STA receives a data packet. Accordingly, the STA receiving the data packet can further accurately estimate and compensate a CFO. As result, a data transmit rate, a data processing rate, and coverage thereof are improved by minimizing an error rate of a data packet. Here, the data transmitting and receiving apparatus and method in accordance with an embodiment of the present invention is described based on a protocol of an IEEE 802.11 system or a WLAN system. However, the present invention is not limited thereto. The data transmitting and receiving apparatus in accordance with an embodiment of the present invention can be applied to any wireless communication system.

In an embodiment of the present invention, a CFO is estimated by a unit of a packet using a preamble located at a header of a data packet transmitted through a wireless channel in an OFDM wireless communication system. Further, data is restored by compensating the estimated CFO when a signal field and a data field of the data packet are restored.

In an embodiment of the present invention, a CFO of a data packet transmitted through a wireless channel is estimated by a unit of a packet in a physical layer (PHY), the estimated CFO and an average value of CFOs estimated during the window period are stored, an estimated CFO of a current data packet is compensated or the average CFO is compensated according to a wireless channel environment in order to improve a data transmit rate, a data processing rate and coverage thereof. The data packet is restored based on the compensated CFO. Accordingly, data is normally transmitted and received. Here, a data packet is restored by compensating a CFO estimated by a unit of a packet or by compensating an average CFO of CFOs estimated during the window period according to a Signal to Noise Ratio (SNR) or a transmission available period allocated for transmitting a data packet between an AP and a STA as the channel state of the wireless channel for transmitting the data packet.

In an embodiment of the present invention, a data packet is restored by compensating a CFO estimated by a unit of a packet or an average CFO of CFOs estimated during the window period based on a TXOP period, a Request to Send (RTS) and a Clear to Send (CTS) control packet in a Media Access Control (MAC) layer in order to improve a data transmit rate, a data processing rate, and coverage of a STA. Here, a data packet transmitted through a wireless channel is restored by compensating a CFO or an AP distorts and transmits a next data packet as much as a CFO estimated from the transmitted data packet. Accordingly, data is normally transmitted and received.

In an embodiment of the present invention, when a SNR is smaller than a predetermined threshold value or when multipath fading is generated due to noise and interference in a wireless channel, it is difficult to accurately estimate a CFO of a data packet transmitted through the wireless channel. That is, the estimated error may include significant error. In this case, the data packet is restored by compensating an average CFO of CFOs estimated during a window period. It is possible to use a preamble of a data packet although multi-path fading is generated when the SNR is larger than a threshold. Accordingly, a CFO of a currently transmitted data packet is estimated by a unit of a packet. A data packet is restored by compensating the estimated CFO. Here, it is quickly adaptive to channel variation because a CFO is estimated by a unit of a packet.

In an embodiment of the present invention, if the TXOP period is smaller than a data information storing window for storing information about a data packet, and if a difference between an estimated CFO of a current data packet currently transmitted through a wireless channel and an estimated CFO of a previous data packet transmitted prior to the current data packet is smaller than a predetermined threshold, a data packet is restored by compensating the estimated CFO of the current data packet. On the contrary, the difference is larger than the predetermined threshold, the data packet is restored by compensating the estimated CFO of the previous data packet. When the TXOP period is larger than the data information storing window period, a data packet is restored by compensating a CFO estimated during the window period until the TXOP period ends. Here, the estimated CFO of the window period is stored.

Further, in the window period, CFOs of transmitted data packets are estimated by a unit of a packet during the window period and an estimated CFO of a corresponding data packet is compensated. After the window period, an average CFO of the estimated CFOs of the window period is compensated for a data packet transmitted after the window period. In other words, a maximum value, a minimum value, and an average CFO of CFOs estimated during the window period are calculated and stored. If an estimated CFO of a current data packet transmitted after the window period is included in between the maximum value and the minimum value of the previously estimated CFOs, an estimated CFO of the current data packet transmitted after the window period. If the estimated CFO of the current data packet is not included, the average CFO is compensated.

In an embodiment of the present invention, a currently transmitted data packet is restored by compensating an estimated CFO of the currently transmitted data packet or an average CFO of CFOs estimated during the window period according to a TXOP period and a channel state of a wireless channel changed by fading and noise. Therefore, data is normally transmitted and received through a wireless channel. Further, an AP distorts a CFO as much as a compensated CFO for the current data packet and transmits the distorted CFO. Accordingly, data is normally transmitted and received through a wireless channel.

In an embodiment of the present invention, a data packet transmission error is minimized by minimizing a CFO estimation error in multipath fading or a poor wireless channel state. Accordingly, a data packet can be transmitted at a high speed. In other words, when a CFO estimation error is generated due to a poor wireless channel state such multipath fading or low SNR, an error is generated in restoring information included in a signal field such as a data packet length and a data transmit rate. Accordingly, an error is generated in a next data packet or data packet transmission is delayed because an end of the data packet is determined inaccurately. As a result, a system performance becomes deteriorated. In the embodiment of the present invention, such CFO estimation error is minimized to overcome the above described problem. Accordingly, a data packet can be transmitted at a high speed. Hereinafter, an apparatus for estimating a CFO of a data packet transmitted through a wireless channel in a data transmitting and receiving apparatus in a wireless communication system, in accordance with an embodiment of the present invention will be described with reference to FIG. 1.

Figure 1:
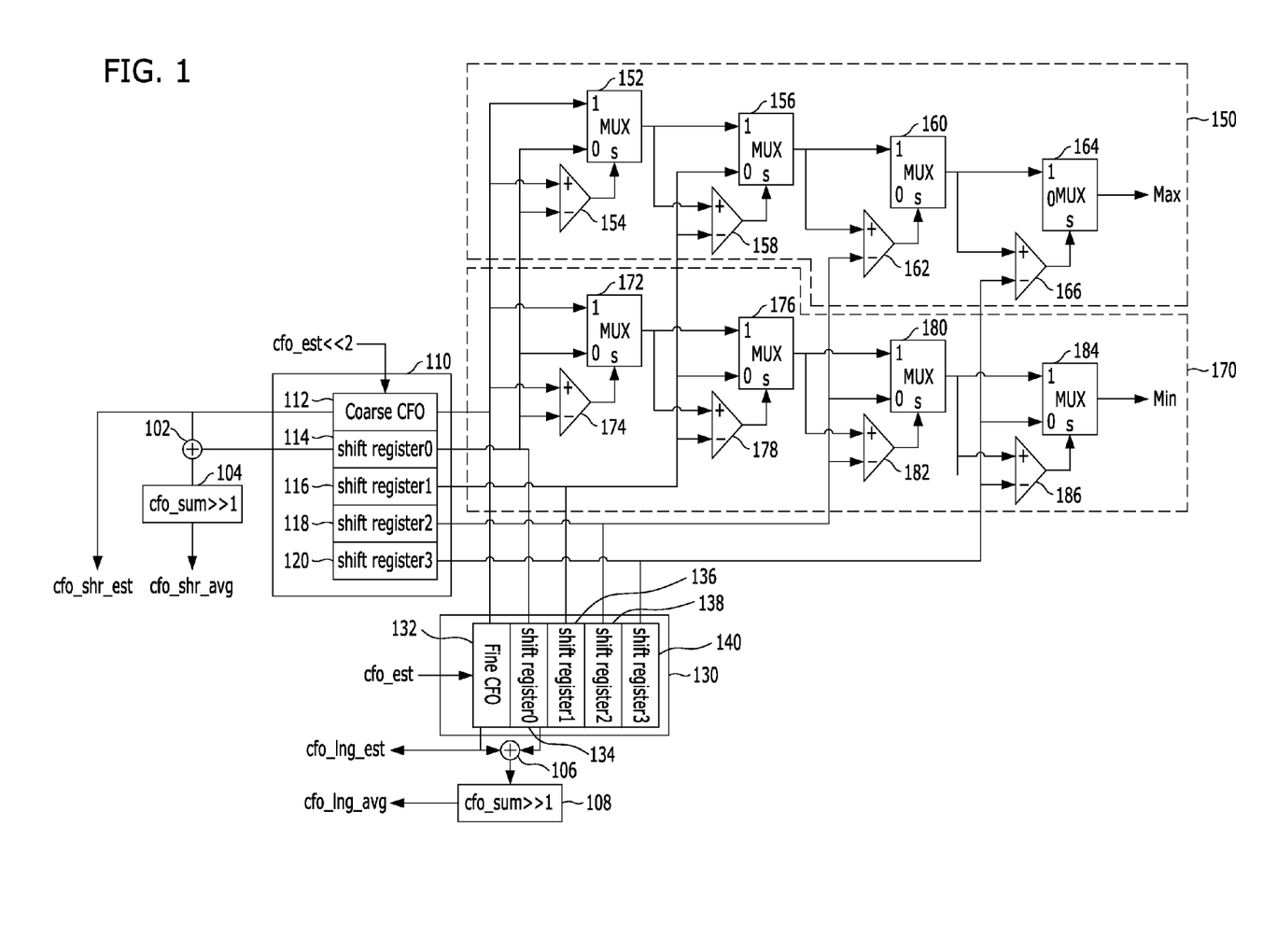
FIG. 1 is a block diagram illustrating an apparatus and method for transmitting and receiving data packets in a wireless communication system in accordance with an embodiment of the present invention.

FIG. 1 is a diagram illustrating an apparatus for estimating a CFO in a wireless communication system in accordance with an embodiment of the present invention.

Referring to FIG. 1, the CFO estimation apparatus in accordance with an embodiment of the present invention includes a first shift register unit 110 for receiving and storing a first calculation result cfo_est<<2 of calculating correlation of a short preamble of a data packet transmitted through a wireless channel, a second shift register unit 130 for receiving and storing a second calculation result cfo_est of calculating correlation of a long preamble of a data packet transmitted through a wireless channel, a first calculator 150 for calculating a maximum value Max of the first calculation result cfo_est<<2 stored in the first shirt register unit 110 and the second calculation result cfo_est stored in the second shift register unit 130, a second calculator 170 for calculating a minimum value Min of the first calculation result cfo_est<<2 stored in the first shirt register unit 110 and the second calculation result cfo_est stored in the second shift register unit 130, a first adder 102 for calculating an accumulated value cfo_shr_est of the first calculation results cfo_est<<2 stored in the first shift register unit 110, a second adder 106 for calculating an accumulated value cfo_lng_est of the second calculation values cfo_est stored in the second shift register unit 130. a third calculator 104 for calculating an average value cfo_shr_avg of the first calculation results cfo_est<<2 stored in the first shift register unit 110, and a fourth calculator 108 for calculating an average value cfo_lng_avg of the second calculation results cfo_est stored in the second shift register unit 130.

Here, the first calculation result cfo_est<<2 is equivalent to a result of dividing the second calculation result cfo_est by a predetermined number such as a packet unit defined as a predetermined window period. The packet unit is a group of the predetermined number of packets. The first calculation result cfo_est<<2 and the second calculation result cfo_est are decided according to a periodicity of a preamble included in a header of a data packet transmitted in a Wireless Local Area Network (WLAN) system. Here, the first calculation result cfo_est<<2 and the second calculation result cfo_est become a result value of the packet unit defined as a predetermined window period.

The apparatus and method in accordance with an embodiment of the present invention is described to restore a data packet by compensating a CFO of a data packet through the maximum value and the minimum value of CFOs calculated by the first and second calculators 150 and 170 and the average CFO calculated by the third calculator 104 and the fourth calculator 108. However, the apparatus in accordance with an embodiment of the present invention may restore a data packet by calculating a statistic CFO of estimated CFOs, which are estimated by a unit of a packet, through the first and second adders 102 and 106 and the third and fourth calculators 104 and 108 and compensating the CFO of a current data packet as one of the statistic CFO and the estimated CFOs.

The first and second shift registers 110 and 130 include a plurality of registers for storing the first calculation results cfo_est<<2 of calculating correlation of a short preamble of data packet and the second calculation results cfo_est of calculating correlation of a long preamble of data packet as a result of a packet unit in a predetermined window period. In the embodiments of the present invention, one window period is defined as a packet unit formed of four packets for convenience. The window period defined by a packet unit of four packets may vary according to a communication environment of a wireless communication system.

Accordingly, the first shift register 110 includes a buffer 112 for receiving the first calculation results cfo_est<<2 and shift registers 114, 116, 118, and 120 for storing the first calculation results cfo_est<<2, which are results of calculating correlation of a short preamble of each data packet in the predetermined window period defined by a packet unit of four packets. The second shift register unit 130 includes a buffer 132 for receiving the second calculation results cfo_est and shift registers 134, 136, 138, and 140 for storing the second calculation results cfo_est, which are results of calculating correlation of a long preamble of each data packet in the predetermined window period defined by a packet unit of four packets. That is, the first shift register unit 110 and the second register unit 130 each includes four shift registers 114, 116, 118, and 120 or shift registers 134, 136, 138, and 140 for storing the first calculation results cfo_est<<2 of calculating correlation of short preambles of four data packets transmitted during one window period and the second calculation results cfo_est of calculating correlation of long preambles of four data packets transmitted during one window period.

The first calculator 150 includes comparators 154, 158, 162, and 166 for comparing the first calculation results cfo_est<<2 and the second calculation results cfo_est stored in the shift registers 114, 116, 118, 120, 134, 136, 138, and 140 included in the first and second shift register units 110 and 130, and MUXs 152, 156, 160, and 164 for calculating a maximum value by selecting one of the comparison results of the comparators 154, 158, 162, and 166, the first calculation result cfo_est<<2, and the second calculation result cfo_est.

Here, the first calculator 150 includes four comparators 14, 158, 162, and 166 and MUXs 152, 156, 160, and 164 for calculating a maximum value of the first calculation result cfo_est<<2 and the second calculation result cfo_est for four data packets transmitted during one window period because one window period is defined as a packet unit of four data packets.

Like the first calculator 150, the second calculator 170 includes comparators 174, 178, 182, and 186 for comparing the first calculation results cfo_est<<2 and the second calculation results cfo_est stored in the shift registers 114, 116, 118, 120, 134, 136, 138, and 140 included in the first shift register unit 110 and the second shift register unit 130, and MUXs 172, 176, 180, and 184 for calculating a minimum value by selecting one of the comparison results of the comparators 174, 178, 182, and 186, the first calculation results cfo_est<<2, and the second calculation results cfo_est.

Since one window period is defined as a packet unit of four packets, the second calculator 170 includes four comparators 174, 178, 182, 186, and MUXs 172, 176, 180, and 184 for calculating a minimum value of the first calculation results cfo_est<<2 and the second calculation results cfo_est.

The first adder 102 and the second adder 106 calculate accumulations of the first calculation results cfo_est<<2, which are results of calculating correlation of short preambles of four data packets transmitted during one predetermined window period, and the second calculation results cfo_est, which are results of calculating correlation of long preambles of four data packets, stored in the shift registers 114, 116, 118, 120, 134, 136, 138, and 140 included in the first shift register unit 110 and the second register unit 130. That is, the first adder 102 and the second adder 106 calculate accumulation values of the predetermined window period.

The third calculator 104 and the fourth calculator 108 calculate an average value of the first calculation results cfo_est<<2, which are results of calculating correlation of short preambles of four data packets transmitted during one predetermined window period, and the second calculation results cfo_est, which are results of calculating correlation of long preambles of four data packets, stored in the shift registers 114, 116, 118, 120, 134, 136, 138, and 140 included in the first shift register unit 110 and the second register unit 130. That is, the third calculator 104 and the fourth calculator 108 calculate average CFOs of the predetermined window period.

As described above, the CFO estimation apparatus in accordance with an embodiment of the present invention calculates and stores estimated CFOs of data packets transmitted through a wireless channel, an average estimated CFO of data packets transmitted during a predetermined window period defined as a packet unit of predetermined packets, a maximum value and a minimum value of the estimated CFOs. Further, the CFO estimation apparatus in accordance with an embodiment of the present invention determines whether an estimated CFO of a currently transmitted data packet is included in between the maximum value and the minimum value of the estimated CFOs. The CFO estimation apparatus in accordance with an embodiment of the present invention restores the currently transmitted data packet by compensating the estimated CFO of the currently transmitted data packet according to the determination result, or restores the currently transmitted data packet by compensating the average CFO of estimated CFOs of the data packets transmitted in the window period. Accordingly, data is normally transmitted or received through a wireless channel.

Here, if a TXOP period is longer than a data packet information storing window for storing information of a data packet, a channel available period is sufficiently provided to a transmitter such as a transmission STA and a receiver such as a reception STA for transmitting and receiving data packet. Accordingly, the transmitted data packet is restored by compensating a CFO, and a transmission and reception success rate of an acknowledgement packet is improved by distorting an estimated CFO thereof as much as the average CFO of estimated CFOs of data packets transmitted in the window period and transmitting the distorted ACK packet. Further, when a next data packet is transmitted, an estimated CFO of the next data packet is distorted as much as the distorted CFO of the ACK packet and transmitted with the next data packet. Accordingly, a data packet transmission and reception success rate is improved, and data can be stably and normally transmitted and received through a wireless channel.

As described above, a compensated CFO, which is compensated when a data packet is restored, is distorted and transmitted when an ACK packet and a next data packet are transmitted. Accordingly, a transmitter compensates a CFO in advance and transmits a data packet or an ACK packet with the compensated CFO in a communication environment where a plurality of STAB are connected through a link. Accordingly, a receiver can further accurately estimate a CFO because a range of estimating a CFO from a limited preamble of a data packet or an ACK packet is expanded. As a result, data is further stably and normally transmitted and received by minimizing a restoration error of the data packet or the ACK packet. Hereinafter, CFO estimation and data packet transmission and reception based on the CFO estimation in accordance with an embodiment of the present invention will be described with reference to FIGS. 2 to 4.

Figure 2:
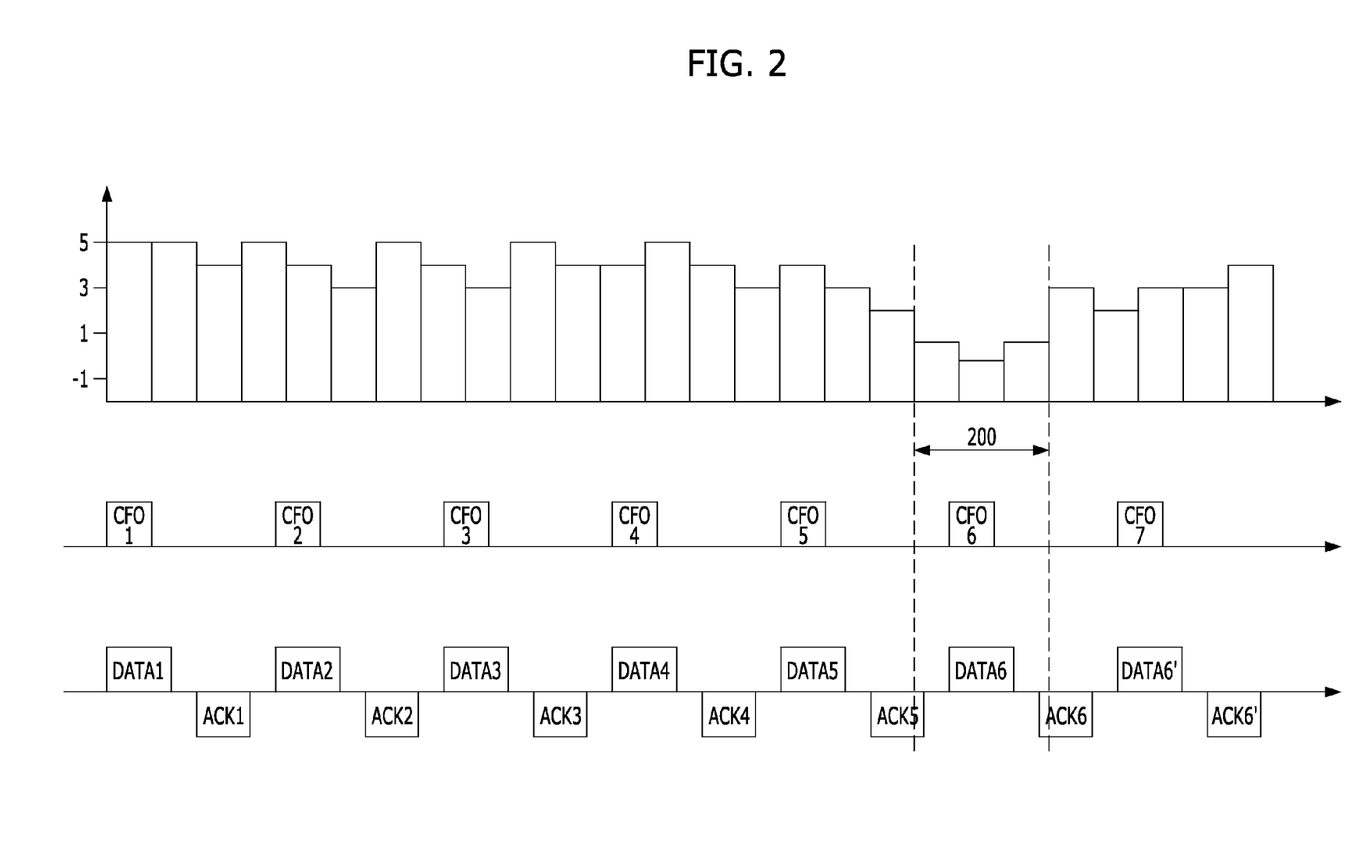
FIGS. 2 to 4 are diagrams illustrating CFO estimation and data packet transmission and reception in a wireless communication system in accordance with an embodiment of the present invention.
Figure 3:
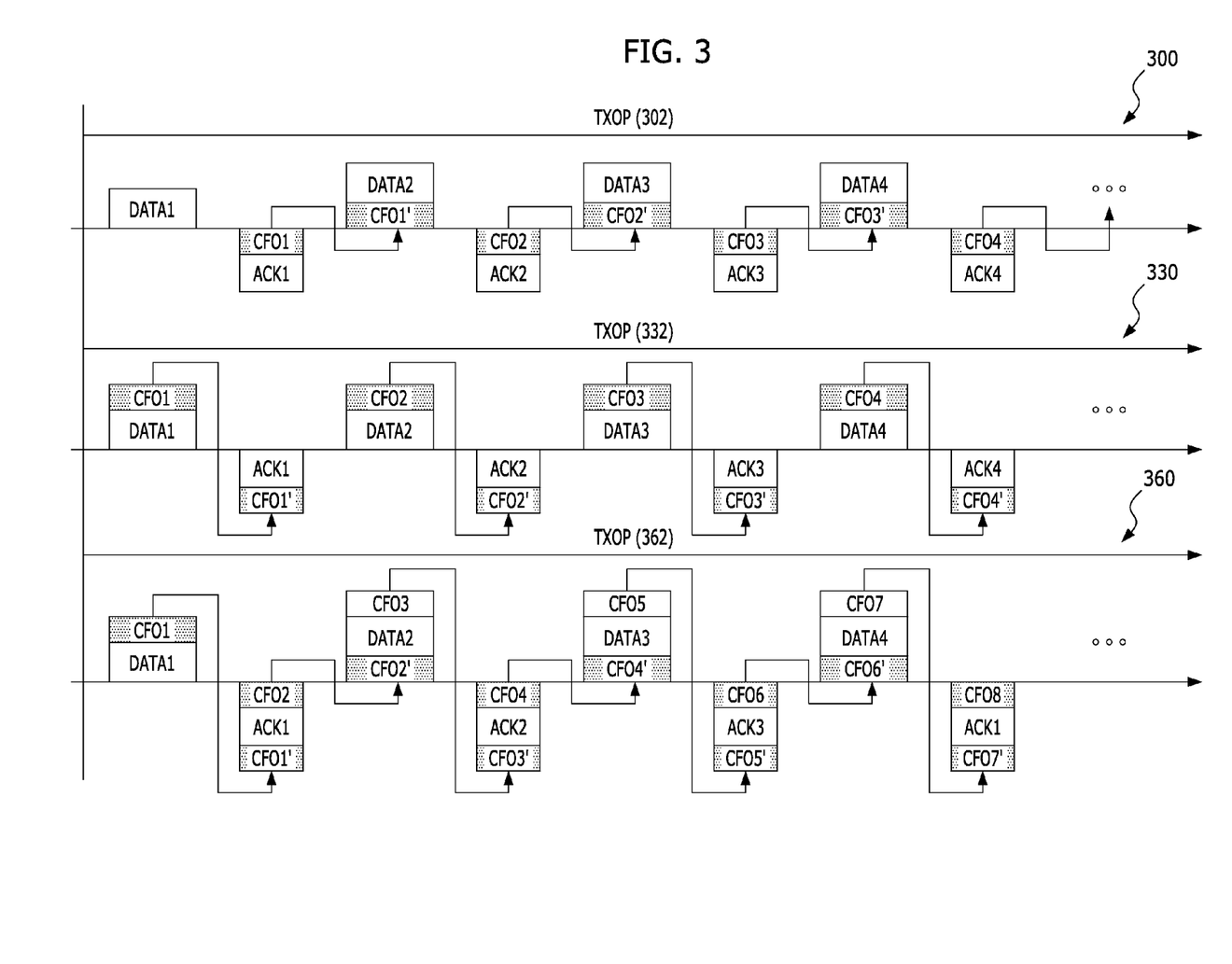
Figure 4:
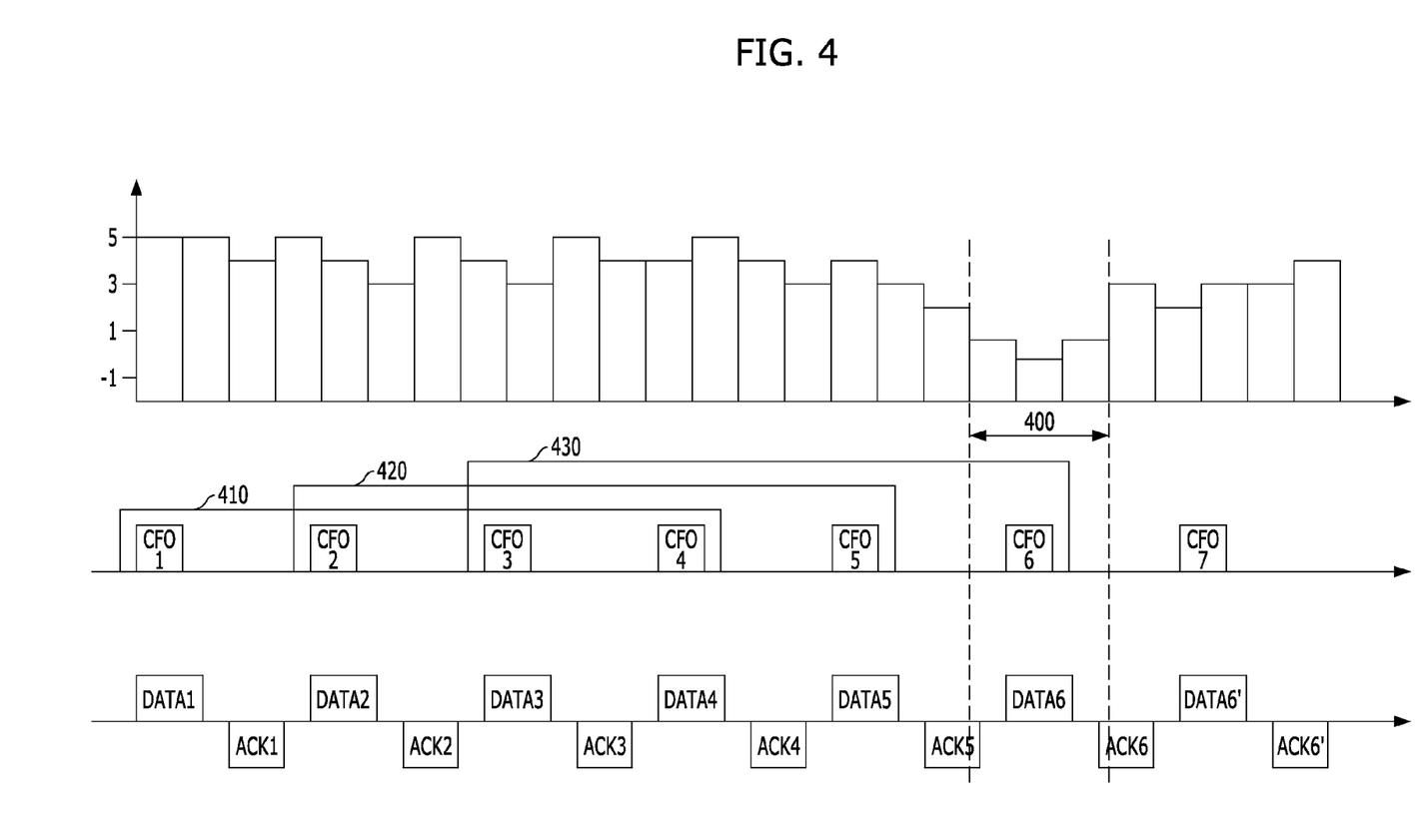

FIGS. 2 to 4 are diagrams illustrating CFO estimation and data packet transmission and reception based on the CFO estimation of a data transmitting/receiving apparatus of a wireless communication system in accordance with an embodiment of the present invention. FIG. 2 is a diagram illustrating CFO estimation in a wireless communication system in accordance with an embodiment of the present invention. FIG. 3 is a diagram illustrating transmission and reception of a response packet such as an acknowledgement ACK packet of a data packet based on an estimated CFO in a wireless communication system in accordance with an embodiment of the present invention. FIG. 4 is a diagram illustrating CFO estimation in a window period in a wireless communication system in accordance with an embodiment of the present invention.

Referring to FIGS. 2 to 4, a data transmitting and receiving apparatus in accordance with an embodiment of the present invention transmits a data packet DATA in a transmit opportunity (TXOP) period through a wireless channel and transmits an acknowledgement (ACK) packet corresponding to the transmitted packet DATA. When the data packet DATA is transmitted through the wireless channel, a CFO of the transmitted data packet DATA is estimated, the transmitted data is restored as described above, and an ACK packet for the restored data packet is transmitted.

As shown in FIGS. 2 and 4, TXOP periods 200 and 400 have a poor wireless channel state. That is, in the TXOP periods 200 and 400, a Signal to Noise Ratio (SNR) is smaller than a predetermined threshold, for example, 1 dB. In other words, an estimated CFO CFO6, which is estimated for a data packet DATA6 transmitted at the TXOP periods 200 and 400, is not included in between a maximum value and a minimum value of estimated CFOs of data packets transmitted during predetermined window periods 410, 420, and 430. In this case, the transmitted data DATA6 is restored by compensating the CFO based on an average CFO of CFOs estimated for data packets transmitted during the window periods 410, 420, and 430, rather than the CFO CFO6 of the data packet DATA6.

Further, when the TXOP period is larger than an information storing window for storing information about a data packet, a channel available period is sufficiently provided to the transmitter such as a transmission station (STA) and the receiver such as a reception STA for transmitting and receiving data. Accordingly, the transmitted data packet DATA is restored using a first transmission scheme 300 by compensating an estimated CFO of a data packet DATA transmitted through a wireless channel at the TXOP period 302 as shown in FIG. 3. After transmitting an acknowledgement (ACK) packet for the transmitted data packet DATA, the compensated CFO is distorted to a distorted CFO CFO' and transmitted with the distorted CFO CFO' with a next data packet.

Also, when an acknowledgement (ACK) packet for the transmitted data packet DATA transmitted through a wireless channel during the TXOP period 332 is transmitted, the estimated CFO (CFO) of the transmitted data packet DATA is distorted and transmitted with the ACK packet using a second transmission method 330 as shown in FIG. 3. That is, the CFO is compensated to a CFO' and transmitted with the ACK packet.

As shown in FIG. 3, a data packet is restored by compensating the estimated CFO of a data packet DATA transmitted through a wireless channel during a TXOP 362 using a third transmission method 360. Further, the compensated CFO is distorted, the distorted CFO CFO' is transmitted with the ACK packet. Accordingly, a transmission/reception success rate of the ACK packet is improved. The ACK packet is restored by compensating an estimated CFO of the ACK packet. When a next data packet is transmitted, the compensated CFO is distorted and the next data packet is transmitted with the distorted CFO CFO' at a TXOP period 362. Accordingly, a transmission/reception success rate of a data packet is improved, and data is stably and successfully transmitted and received through a wireless channel.

Here, the first transmission method 300 and the second transmission method 330 may be performed in a single STA of a wireless communication system. The third transmission method 360 may be used by a plurality of STAs connected through a link in a wireless communication system. In the first to third transmission methods 300, 330, and 360, a compensated CFO, which is compensated for restoring a data packet DATA and an acknowledgement (ACK) packet, and a distorted CFO', which is distorted for transmitting corresponding data packets, compensate or distort an estimated CFO of a data packet DATA and an ACK packet according to a TXOP period or a wireless channel state such as a SNR. Or the compensated CFO and the distorted CFO CFO' compensate or distort an average CFO of the estimated CFOs of the data packets or the ACK packets transmitted during a window period.

As described above, the compensated CFO, which is compensated for restoring a data packet, is distorted in advance when an ACK packet and a next data packet are transmitted. That is, in a communication environment having a plurality of STAs connected through a link, a transmitter transmits a data packet or an ACK packet by distorting the compensated CFO in advance. Accordingly, a receiver receiving the data packet and the ACK packet can accurately estimate a CFO due to the expansion of an estimation range from a limited preamble of the data packet or the ACK packet. Further, a restoration error of the data packet or the ACK packet is minimized. As a result, data can be stably and normally transmitted and received. Hereinafter, CFO estimation and data packet transmission and reception in a wireless communication in accordance with an embodiment of the present invention will be described with reference to FIG. 5.

Figure 5:
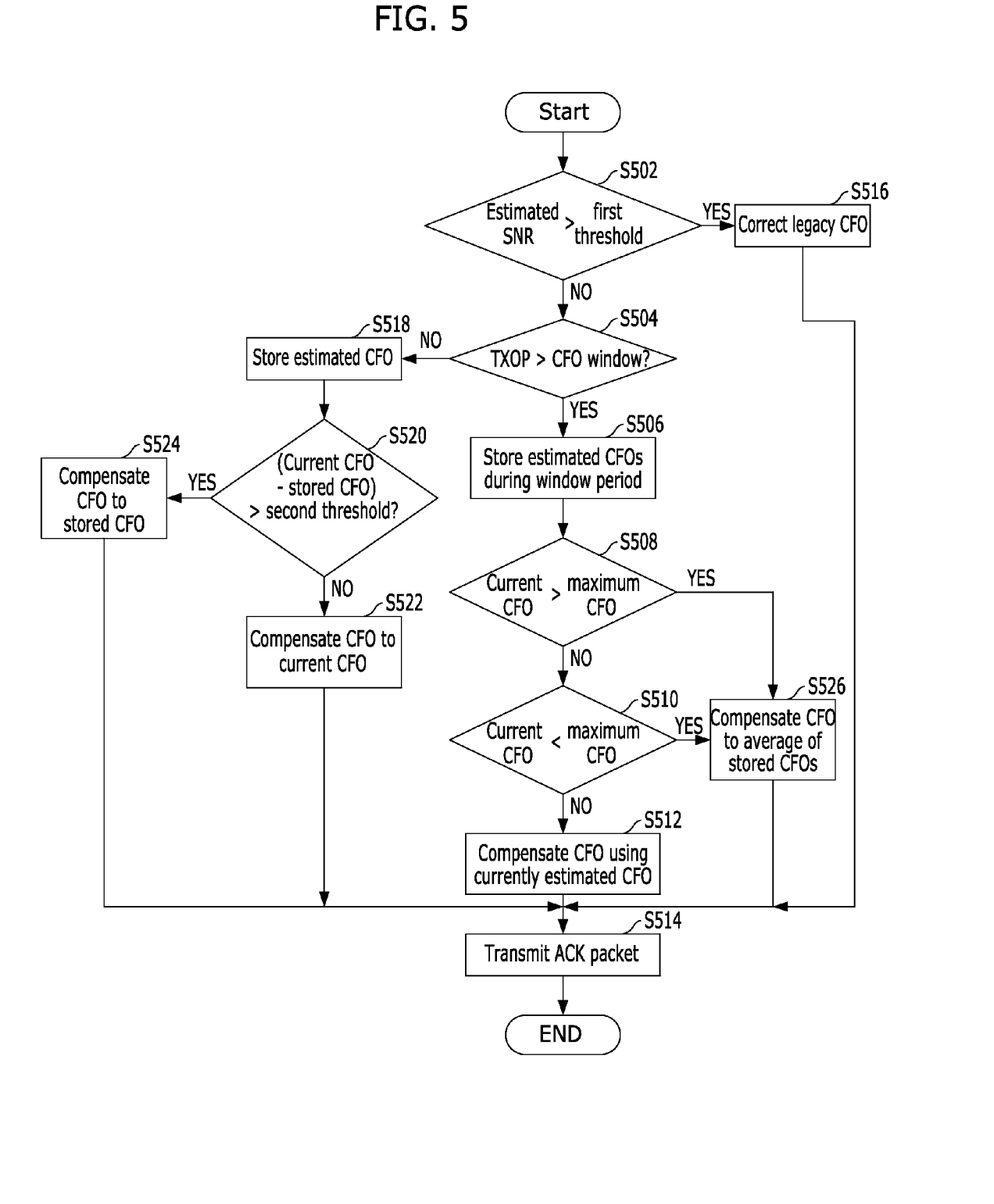
FIG. 5 is a flowchart illustrating a method for receiving data in a wireless communication system in accordance with an embodiment of the present invention.

FIG. 5 is a flowchart illustrating a method for receiving data in a data receiving apparatus of a wireless communication system in accordance with an embodiment of the present invention.

Referring FIG. 5, at step S502, a channel state of a wireless channel is estimated when the data packet is transmitted through the wireless channel. That is, a SNR of the wireless channel is estimated, the estimated SNR is compared with a predetermined first threshold, and the channel state of the wireless channel is estimated based on the comparison result. When the estimated SNR is larger than the first threshold at stop S502, the estimated CFO of the transmitted data packet is corrected to a legacy CFO and the transmitted data packet is restored using the compensated CFO at step S516. Here, the legacy CFO is a CFO estimated by a unit of a packet.

When an acknowledgement (ACK) packet for the transmitted data packet is transmitted at step S514, a CFO of the ACK packet is distorted in advance as much as the compensated CFO used for restoring the data packet and the acknowledgement (ACK) packet is transmitted with the distorted CFO. That is, the acknowledgement packet is transmitted with a CFO distorted in advance to a transmitter such as an AP that transmits the data packet. Due to the CFO distorted in advance, a CFO estimation range of the AP increases. Accordingly, the transmitter can further accurately estimate a CFO of the acknowledgement packet. After the transmitter restores the acknowledgement packet by compensating an estimated CFO, the transmitter distorts a CFO of a next data packet in advance as much as the compensated CFO used for restoring the acknowledgement packet, and transmits the next data packet with the CFO distorted in advance. As a result, a data transmit rate of data packets and acknowledgement packets is improved and data is stably and normally transmitted and received through a wireless channel in the embodiment of the present invention. Further, a data processing rate and a coverage thereof are increased due to the improvement of the data transmit rate of a limited wireless channel. As a result, an overall system performance is improved.

When the wireless channel has a poor state because the estimated SNR is smaller than the first threshold at step S502, it is determined whether a TXOP period for transmitting data between the transmitter such as an AP and a receiver such as a STA is larger than a predetermined window period defined as a packet unit of predetermined data packets at step S504. In other words, it is determined whether the TXOP period is larger than an information storing period for storing information of a data packet. Here, the window period is setup as a predetermined packet unit formed of predetermined data packets. For example, the window period is setup as a packet unit of four data packets.

When it is determined that the TXOP period is larger than the information storing period at step S504, a channel available period for transmitting and receiving data packet is sufficiently provided between the transmitter and the receiver. Thus, a data packet is restored by compensating a CFO. Further, a CFO of an acknowledgement packet for the transmitted data packet is distorted as much as an average CFO of CFOs estimated during the window period for transmitting data packets and the distorted CFO is transmitted with the acknowledgement packet. Accordingly, a transmission/reception success rate of an acknowledgement packet for a transmitted data packet is improved. Moreover, a data packet transmission and reception success rate is improved by distorting a CFO of a next data packet as much as the distorted CFO and transmitting the distorted CFO with the next data packet. Accordingly, data can be stably and normally transmitted and received through a wireless channel.

When the TXOP period is larger than the window period, a CFO of a data packet transmitted at the window period is estimated by a unit of a packet at step S506. The estimated CFO is stored. Also, a maximum value and a minimum value among the CFOs estimated during the window period are calculated and stored. Further, an average CFO thereof is calculated and stored. At steps S508 and S510, it is determined whether an estimated CFO of a current data packet transmitted through a wireless channel is included between the calculated maximum value and the calculated minimum value of the window period.

When it is determined that the estimated CFO of current data packet is included in between the maximum value and the minimum value at steps S508 and S510, the current data packet is restored by compensating the CFO of the current data packet based on the estimated CFO of the current data packet at step S512. At step S514, a CFO of an acknowledgement packet for the current data packet is distorted in advance as much as the CFO used for restoring the current data packet and the distorted CFO is transmitted with the acknowledgement packet.

When it is determined that the estimated CFO of the current data packet is not included in between the maximum value and the minimum value at steps S508 and S510, the current data packet is restored by compensating the estimated CFO of the current data packet to the average CFO of CFOs estimated during the window period at step S526. At step S514, a CFO of the acknowledgement packet for the current data packet is distorted in advance as much as the CFO used for restoring the current data packet and the distorted CFO is transmitted with the acknowledgement packet as described above.

When it is determined that the TXOP period is smaller than the window period at step S504, a current data packet is restored by compensating a CFO and transmits an acknowledgement packet without distorting a CFO for the acknowledgement packet. That is, when the TXOP period is smaller than the information storing window, a channel available period is not sufficiently secured between the transmitter and the receiver for transmitting and receiving data packets. Accordingly, the current data packet is restored only by compensating a CFO, and the acknowledgement packet for the current data packet is transmitted without distorting the CFO.

Accordingly, when the TXOP period is smaller than the window period, CFOs estimated by a unit of a packet are stored at step S518. At step S520, a difference between an estimated CFO of a current data packet currently transmitted through a wireless channel and the stored CFO is compared with a predetermined second threshold. In other words, a further accurately estimated CFO is selected from the estimated CFO of the current data packet and the stored CFO at step S520. That is, it is determined which of the estimated CFO of the current data packet and an estimated CFO of a previously transmitted data packet is more accurate at step S520.

When it is determined that the estimated CFO of the previously transmitted data packet is more accurate than the estimated CFO of the current data packet at step S520, the current data packet is restored by compensating the estimated CFO of the current data packet to the estimated CFO of the previously transmitted data packet at step S524. Then, as described above, a CFO of an acknowledgement packet for the current data packet is distorted as much as the compensated CFO used when the current data packet is restored and the distorted CFO is transmitted with the acknowledgement packet at step S514.

When it is determined that the estimated CFO of the current data packet is more accurate than the stored CFO which is estimated for the previously transmitted data packet at step S520, the current data packet is restored by compensating the estimated CFO of the current data packet to the estimated CFO of the current data packet at step S522. Then, as described above, a CFO of an acknowledgement packet for the current data packet is distorted as much as the compensated CFO used when the current data packet is restored and the distorted CFO is transmitted with the acknowledgement packet at step S514.

Accordingly, a packet restoration error and a packet loss can be prevented by accurately estimating a CFO without failing estimating a CFO of a data packet, which may be occurred when a wireless channel has a poor state such as a wireless channel having a small SNR, a multiple-path fading, or a large delay. Therefore, a data packet transmit rate, a data processing rate, and coverage thereof are improved, and an overall system performance is improved.

While the present invention has been described with respect to the specific embodiments, it will be apparent to those skilled in the art that various changes and modifications may be made without departing from the spirit and scope of the invention as defined in the following claims.

What is claimed is:

1. A method for transmitting and receiving data in a wireless communication system, comprising:
   estimating, during a window period, a plurality of carrier frequency offsets (CFOs) of data packets including a predetermined packet, transmitted during a transmit opportunity (TXOP) period;
   calculating an average CFO of the plurality of the estimated CFOs;

selecting one of the plurality of the estimated CFOs of the predetermined data packet or the average CFO based on a channel state of a wireless channel carrying the data packets; and
restoring the predetermined data packet with respect to the selected CFO.

2. The method of claim 1, wherein the window period is a group of the predetermined number of the data packets.

3. The method of claim 2, wherein the channel state is defined based on a signal to noise ratio (SNR) of the wireless channel.

4. The method of claim 1, further comprising:
comparing the TXOP period with the window period; and
defining a maximum value and a minimum value of the plurality of the estimated CFOs, based at least partly on results of said comparing.

5. The method of claim 4, wherein said selecting the CFO selects the one of the plurality of the estimated CFOs of the predetermined data packet when the one of the plurality of the estimated CFOs of the predetermined data packet falls in a range between the maximum value and the minimum value.

6. The method of claim 4, wherein said selecting the CFO selects the average CFO or a value of CFOs between the maximum value and the minimum value when all of the plurality of the estimated CFOs of the predetermined data packet falls out of a range between the maximum value and the minimum value.

7. The method of claim 1, further comprising:
compensating a CFO of an acknowledgement packet for the predetermined data packet as much as the CFO compensated for the predetermined packet by selecting one of the plurality of the estimated CFOs of the predetermined data packet or the average CFO, and
transmitting the acknowledgement packet through a wireless channel of the data packets.

8. The method of claim 7, further comprising:
estimating a CFO of the acknowledgement packet transmitted through the wireless channel;
compensating a CFO of a next data packet based on the CFO estimated for the acknowledgement packet, and
transmitting the next data packet through the wireless channel.

9. A method for transmitting and receiving data in a wireless communication system, comprising:
estimating, during a window period, a plurality of carrier frequency offsets (CFOs) of data packets, including a predetermined data packet transmitted during a transmit opportunity (TXOP) period;
storing the plurality of the estimated CFOs of the data packets transmitted during the TXOP period if the TXOP period is smaller than the window period;
comparing one of the plurality of the stored CFOs with a CFO of a previous data packet transmitted prior to the predetermined data packet;
selecting the one of the plurality of the stored CFOs of the predetermined data packet or the CFO of the previous data packet based on results of said comparing; and
restoring the predetermined data packet with respect to the selected CFO.

10. An apparatus for transmitting and receiving data in a wireless communication system, comprising:
a transmitter configured to transmit data packets including a predetermined data packet during an transmit opportunity (TXOP) period through a wireless channel;
an estimator configured to estimate a plurality of carrier frequency offsets (CFOs) of the data packets transmitted during the TXOP period and calculate an average CFO of the plurality of the estimated CFOs of a predetermined window period, the predetermined window period being defined as a group of the predetermined number of the data packets;
and a receiver configured to restore the predetermined data packet based on selecting one of the plurality of the estimated CFOs of the predetermined data packet or the average CFO of the plurality of the estimated CFOs.

11. The apparatus of claim 10, wherein the estimator includes:
a circuit unit configured to store and shift the plurality of the estimated CFOs; and
a calculator configured to calculate a maximum value and a minimum value of the plurality of the estimated CFOs, based at least partly on results of comparing the TXOP period with the window period.

12. The apparatus of claim 11, wherein
the receiver selects the one of the plurality of the estimated CFOs of the predetermined data packet when the one of the plurality of the estimated CFOs of the predetermined data packet falls in a range between the maximum value and the minimum value, and
the receiver selects the average CFO or a value of CFOs between the maximum value and the minimum value when all of the plurality of the estimated CFOs of the predetermined data packet falls out of a range between the maximum value and the minimum value.

13. The apparatus of claim 10, wherein the receiver compensates one CFO of an acknowledgement packet for the predetermined data packet as much as the CFO compensated for the predetermined data packet by selecting one of the plurality of the estimated CFOs of the predetermined data packet or the average CFO, and transmits the acknowledgement packet to the transmitter.

14. The apparatus of claim 13, wherein the transmitter estimates the CFO of the acknowledgement packet transmitted through the wireless channel, compensates a CFO of a next data packet based on the CFO estimated for the acknowledgement packet, and transmits the next data packet to the receiver through the wireless channel.

15. An apparatus for transmitting and receiving data in a wireless communication system, comprising:
a transmitter configured to transmit data packets including a predetermined data packet during an transmit opportunity (TXOP) period through a wireless channel;
an estimator configured to estimate a plurality of carrier frequency offsets (CFOs) of the data packets transmitted during the TXOP period and calculate an average CFO of the plurality of the estimated CFOs of a predetermined window period, the predetermined window period being defined as a group of the predetermined number of the data packets; and
a receiver compares one of the plurality of the estimated CFOs with a CFO of a previous data packet which is transmitted prior to the predetermined data packet;
wherein the receiver selects the one of the plurality of the estimated CFOs of the predetermined data packet or the CFO of the previous data packet based on results of said comparing.

* * * * *